(12) United States Patent
Neelamani et al.

(10) Patent No.: US 8,280,695 B2
(45) Date of Patent: Oct. 2, 2012

(54) METHOD TO ADAPT A TEMPLATE DATASET TO A TARGET DATASET BY USING CURVELET REPRESENTATIONS

(75) Inventors: Ramesh Neelamani, Houston, TX (US); Anatoly Baumstein, Houston, TX (US); Warren S. Ross, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 209 days.

(21) Appl. No.: 12/675,083

(22) PCT Filed: Aug. 28, 2008

(86) PCT No.: PCT/US2008/074609
§ 371 (c)(1),
(2), (4) Date: Feb. 24, 2010

(87) PCT Pub. No.: WO2009/051900
PCT Pub. Date: Apr. 23, 2009

(65) Prior Publication Data
US 2011/0147004 A1 Jun. 23, 2011

Related U.S. Application Data

(60) Provisional application No. 60/999,286, filed on Oct. 17, 2007.

(51) Int. Cl.
*H03F 1/26* (2006.01)
*G01V 1/00* (2006.01)
*G06G 7/48* (2006.01)
(52) U.S. Cl. ............... 702/191; 367/73; 703/10
(58) Field of Classification Search .......... 702/1–2, 702/11–14, 16–17, 81, 84, 182–183, 189–191, 702/194–197; 166/369; 367/14, 21, 37–38, 367/43–48, 64, 73; 382/109; 700/28–32; 703/2, 5, 10
See application file for complete search history.

(56) References Cited

U.S. PATENT DOCUMENTS 6,507,787 B1  1/2003  Da Silva et al.
(Continued)

FOREIGN PATENT DOCUMENTS

WO   WO 2006064239 A1 *  6/2006

OTHER PUBLICATIONS

Van Ginkel, M., Image Analysis Using Orientation Space based on Steerable Filters, 2002, ASCI Dissertation Series No. 79, 265 pp.*

(Continued)

*Primary Examiner* — Toan M Le
(74) *Attorney, Agent, or Firm* — ExxonMobile Upstream Research Company Law Dept.

(57) ABSTRACT

Method for adapting a template to a target data set. The template may be used to remove noise from, or interpret noise in, the target data set. The target data set is transformed (550) using a selected complex-valued, directional, multi-resolution transform ('CDMT') satisfying the Hubert transform property at least approximately. An initial template is selected, and it is transformed (551) using the same CDMT. Then the transformed template is adapted (560) to the transformed target data by adjusting the template's expansion coefficients within allowed ranges of adjustment so as to better match the expansion coefficients of the target data set. Multiple templates may be simultaneously adapted to better fit the noise or other component of the data that it may be desired to represent by template.

22 Claims, 5 Drawing Sheets

U.S. PATENT DOCUMENTS

| | | | |
|---|---|---|---|
| 6,832,161 | B1 | 12/2004 | Moore |
| 6,894,948 | B2 | 5/2005 | Brittan et al. |
| 7,149,630 | B2 | 12/2006 | Abma |
| 7,197,399 | B2 | 3/2007 | Matson et al. |
| 2002/0173917 | A1 | 11/2002 | Nickel |
| 2006/0064239 | A1 | 3/2006 | Ishii |
| 2006/0190181 | A1 | 8/2006 | Deffenbaugh et al. |
| 2007/0038691 | A1 | 2/2007 | Candes et al. |
| 2007/0047841 | A1 | 3/2007 | Berkner et al. |
| 2007/0064535 | A1 | 3/2007 | Burnstad |

OTHER PUBLICATIONS

Abma, R., et al. (2002), "Comparisons of Adaptive Subtraction Techniques for Multiple Attenuation", SEG Expanded Abstracts 21, 4 pgs.

Berkhout, A.J. et al. (1999), "Removal of Internal Multiples", SEG Expanded Abstracts 18, 4 pgs.

Beyreuther, M., et al. (2005), "Computation of Time-Lapse Differences with 3D Directional Frames", SEG Expanded Abstracts 24, p. 2488-2491.

Candes, E., et al. (2005), "Fast Discrete Curvelet Transforms", SIAM Multiscale Model. Simul., v. 5, No. 3, pp. 861-899.

Candes, E., et al. (1999), "Curvelets—A Surprisingly Effective Nonadaptive Representation for Objects with Edges, Curves and Surfaces", L.L. Schumaker et al. (ed's), Vanderbilt University Press, pp. 104-119.

Chaux, C. et al. (2007), "2D Dual-Tree Complex Biorthogonal M-Band Wavelet Transform", 2007 IEEE Int'l. Conf. on Acoustics, Speech and Signal Processing (IEEE Cat. No. 07CH37846), pp. III-845-III-848.

Daubechies, I. et al. (2004), "An Iterative Thresholding Algorithm for Linear Inverse Problems with a Sparsity Constraint", Communications on Pure and Applied Mathematics 57, pp. 1413-1457.

Do, M.N. (2001), "Directional Multiresolution Image Representations", Thesis No. 2500, University of Canberra, Australia, 184 pgs.

Do, M.N., et al. (2005), "The Contourlet Transform: An Efficient Directional Multiresolution Image Representation", IEEE Transactions Image on Processing 14, pp. 2091-2106.

Efron, B., et al. (2004), "Least Angle Regression", The Annals of Statistics, v. 32, No. 2, pp. 407-499.

Hennenfent, G., et al. (2006), "Seismic Denoising with Nonuniformly Sampled Curvelets", Computing in Science and Engineering 8, pp. 16-25.

Hermann, F., et al. (2004), "Curvelet-Domain Multiple Elimination with Sparseness Constraints", 74th SEG Annual Meeting, Expanded Abstracts, 4 pgs.

Jervis, M. (2006), "Edge Preserving Filtering on 3-D Seismic Data Using Complex Wavelet Transforms", XP002485321, SEG/New Orleans 2006 Annual Meeting, pp. 2872-2876.

Julien, P., et al. (1989), "Adaptive Subtraction of Emulated Multiples", SEG Expanded Abstracts 8, p. 1118-1120.

Kostov, C., et al. (1995), "Moveout-Discriminating Substraction of Multiples", SEG Expanded Abstracts 14, p. 1464-1467.

Lu, Y.M., et al. (2007), Multidimensional Directional Filter Banks and Surfacelets, IEEE Transactions on Image Processing 16, pp. 918-931.

Magarey, J.F. et al. (1998), "Motion Estimation Using a Complex-Valued Wavelet Transform", IEEE Trans. on Signal Processing 46, pp. 1069-1084.

Mallat, S. (1998), "A Wavelet Tour of Signal Processing", Academic Press, p. 409, pp. 441-446.

Miller, M.A., et al. (2005), "Seismic Image Reconstruction Using Complex Wavelets", XP002485322, SPIE-IS&T/v. 5674, pp. 27-35.

Nekut, A.G., et al. (1998), "Minimum Energy Adaptive Subtraction in Surface-Related Multiple Attenuation", SEG Expanded Abstracts 17, 4 pgs.

Nguyen, T.T., et al. (2006), "A Shift-Invariant Multiscale Multidirection Image Decomposition", IEEE Int'l Conf. on Acoustics, Speech and Signal Processing, pp. II-153-II-156.

Ross, W.S., et al. (1987), "Vertical Seismic Profile Reflectivity: Ups Over Downs", Geophysics, v. 52, No. 8, pp. 1149-154.

Selesnick, I.W., et al. (2005), "The Dual-Tree Complex Wavelet Transform", XP002485324, IEEE Signal Processing Magazine, pp. 123-151.

Starck, J-L., et al. (2002), "The Curvelet Transform for Image Denoising", XP002244433, IEEE Transactions on Image Processing, v. 11, No. 6, pp. 670-684.

Tibshirani, R. (1996), "Regression Shrinkage and Selection via the Lasso", J.R. Statist. Soc. B, v. 58, No. 1, pp. 267-288.

Van Borselen, R., et al. (2003), "Target-Oriented Adaptive Subtraction in Data-Driven Multiple Removal", The Leading Edge 22, p. 340-342.

Verschuur, et al. (1998), "Comparing the Interface and Point Scatterer Methods for Attenuating Internal Multiples: A Study with Synthetic Data—Part I", SEG Expanded Abstracts 17, 8 pgs.

Verschuur, et al. (1996), "Surface and Internal Multiple Removal, Towards a Methodology", SEG Expanded Abstracts 15, p. 1539-1542.

Woodard, A.M., et al. (2004), "Fast Automatic Registration of Images Using the Phase of a Complex Wavelet Transform: Application to Proteome Gels", The Analyst 129, pp. 542-552.

Zhou, B., et al. (1991), "Dereverberation of Seismic Data by 2-D Nonlinear Filtering: A Wave Equation-Based Approach", SEG Expanded Abstracts 10, p. 1315.

*European Search Report*, dated Jul. 30, 2008.

*International Search Report and Written Opinion*, dated Nov. 19, 2008.

\* cited by examiner

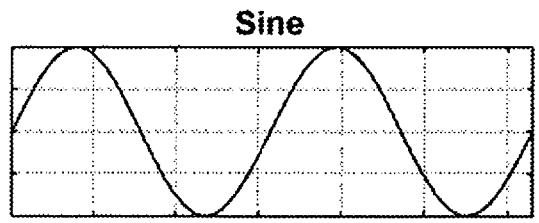
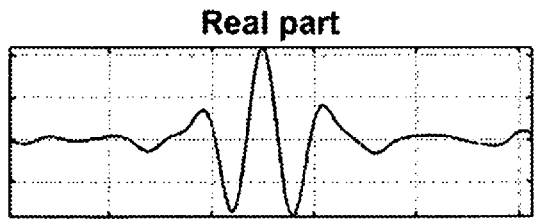
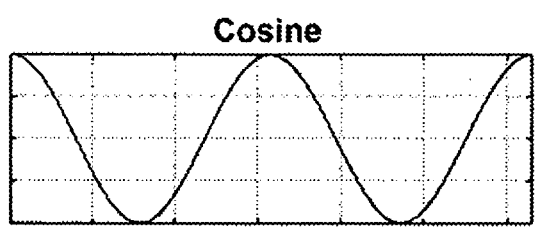
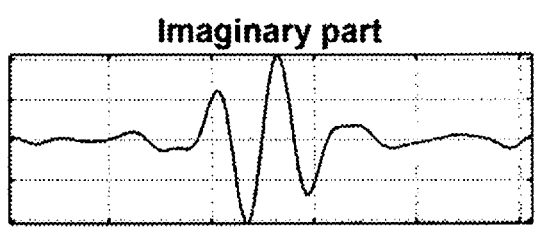
*Fig. 3A*     *Fig. 3B*
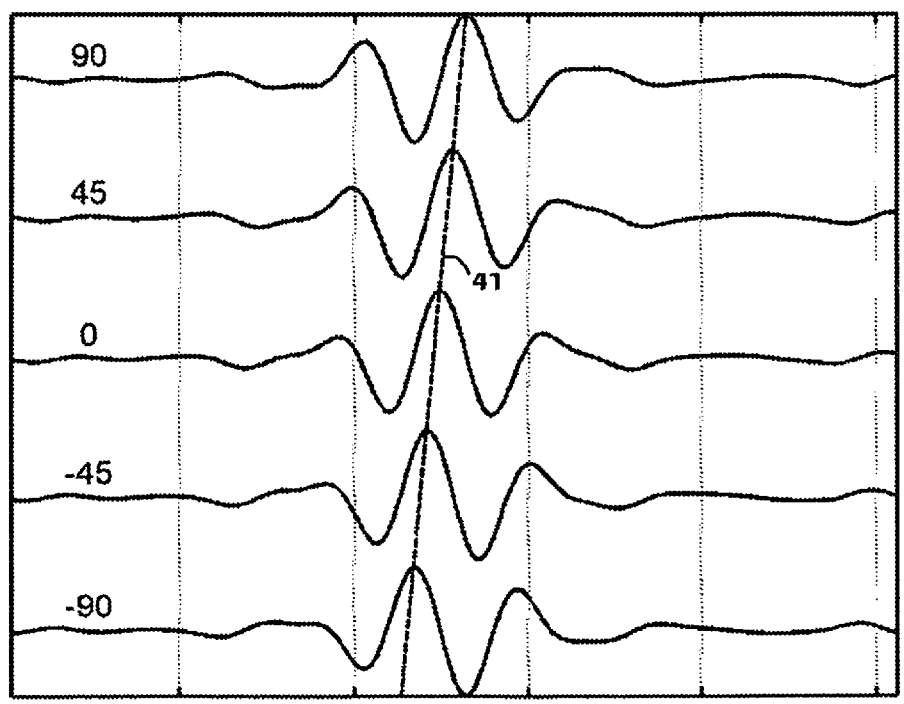
*Fig. 4*

METHOD TO ADAPT A TEMPLATE DATASET TO A TARGET DATASET BY USING CURVELET REPRESENTATIONS

CROSS REFERENCE TO RELATED APPLICATIONS

This application is the National Stage entry under 35 U.S.C. 371 of PCT/US2008/074609 that published as WO 2009/051900 and was filed on 28 Aug. 2008, which claims the benefit of U.S. Provisional Application No. 60/999,286, filed on 17 Oct. 2007, each of which is incorporated by reference, in its entirety, for all purposes.

FIELD OF THE INVENTION

This invention relates generally to the field of geophysical prospecting and, more particularly, to geophysical data processing. Specifically, the invention is a method for adapting a template dataset such that it better matches a target dataset.

BACKGROUND OF THE INVENTION

The technical problem addressed is how to adapt a template dataset so that it matches a target dataset better. The need to adapt a template dataset to better match a target dataset arises routinely in geophysical data processing, analysis, and interpretation. For example, geophysical data contain several types of interfering and undesirable patterns (termed "noise"). The presence of such noise patterns makes it difficult to identify geologic features (termed "signal") of interest such as those that may contain hydrocarbons. Attenuating the interfering noise patterns in geophysical data improves the detectability and/or interpretability of geologic features. Templates for the noise patterns can often be constructed by using prior knowledge of signal and noise in conjunction with the physics of seismic wave propagation. Since the knowledge about signal and noise that is incorporated during the template construction is never perfect, the predicted templates invariably contain errors. Hence the noise patterns in the target dataset cannot be attenuated by straightforward subtraction of the predicted noise templates. First, the predicted noise template needs to be adapted to overcome the spatially and temporally varying prediction errors and to better match the corresponding noise features in the target dataset. Then the noise in the target dataset can be attenuated by subtracting the adapted noise template.

The amount by which the template can be allowed to change during adaptation (that is, the level of adaptation) is typically problem dependent. Hence the adaptation always needs to be controlled with some constraints. If the adaptation is not adequately constrained, then some features in the adapted noise template would also match the signal components of the target dataset (i.e., overfitting), which is undesirable. For example, in the noise attenuation application described above, looser constraints during adaptation would provide better noise subtraction, but may also cause more damage to the signal. In the subtraction example, the constraints imposed during the adaptation balance the unavoidable tradeoff between noise subtraction and signal preservation. In general, the constraints imposed during adaptation balance the unavoidable tradeoff between the adapted template features not matching some relevant noise features (underfitting) versus matching some irrelevant signal features in the target dataset (overfitting).

Example applications of adapting template datasets include Surface multiple attenuation, ground roll removal, 4D seismic differencing, and Internal multiple attenuation. Next, some adaptation approaches that have been used and disclosed in the published literature are briefly described.

Least Squares Matching (and Subtraction for Noise Attenuation)

A commonly employed adaptation approach (see U.S. Pat. No. 6,894,948) called the least-squares method adapts the template within small data windows using constrained convolutional filters such that energy of the residual data after subtraction of the adapted template from the target dataset is minimized. In one embodiment, an upgoing wavefield from a seismic experiment is used as a template for the noise in the downgoing wavefield. The template is adapted by convolution with a set of filters so that it best matches the data in the least squares sense; that is, the energy in the difference between the signal and the adapted template is minimized.

This method is also applied widely in traditional noise suppression, where prediction of reverberations are first adaptively matched to reverberations in the data and then subtracted from seismic data. See, for example,
1. Target-oriented adaptive subtraction in data-driven multiple removal, Roald van Borselen, Grog Fookes, and John Brittan, *The Leading Edge* 22, 340 (2003)
2. Comparisons of adaptive subtraction techniques for multiple attenuation, Ray Abma, Nurul Kabir, Ken H. Matson, Simon A. Shaw, Bill McLain, and Scott Michell, *SEG Expanded Abstracts* 21, 2186 (2002)
3. Minimum energy adaptive subtraction in surface-related multiple attenuation, A. G. Nekut and D. J. Verschuur, *SEG Expanded Abstracts* 17, 1507 (1998)
4. Moveout-discriminating adaptive subtraction of multiples, Clement Kostov and Dave Nichols, *SEG Expanded Abstracts* 14, 1464 (1995)
5. Adaptive subtraction of emulated multiples, Philippe Julien and Jean-Jacques Raoult, *SEG Expanded Abstracts* 8, 1118 (1989)

The various current methods of adaptive matching attempt to use characteristics of the difference between signal and noise, plus the pattern or template of the noise obtained from a prediction method, to optimally match and subsequently remove the noise. Filters can be 1-D or 2-D (i.e. either only in time or in both time and space), and methods can use energy minimization in the window (after matching and subtraction) either weighted or not by prior information such as dip differences between signal and noise.

The least-squares based adaptation approach is limited by the rigid choice of adaptation constraints that is imposed on all reflectors that fall within a chosen data window. When such an adapted template is employed in the noise attenuation problem, the rigid choice of adaptation constraints within each window prevents the least squares approach from balancing the tradeoff between noise subtraction and signal preservation on a reflector-by-reflector basis.

Nonlinear Adaptive Matching and Removal of Template Patterns

Another approach is to use the template with the data in a nonlinear way in order to suppress the noise from the data. As disclosed in "Dereverberation of seismic data by 2-D nonlinear filtering: A wave equation-based approach," Binzhong Zhou and Stewart Greenhalgh, *SEG Expanded Abstracts* 10, 1315 (1991), the template and the data are both either used in the time-space domain or transformed into a traditional domain such as 2-D Fourier, and the portions of the data that overlap the template in the chosen domain are removed or reduced in amplitude by a formula that may be nonlinear with respect to the data amplitudes. The approach matches the template to the data (i.e. allows for adaptation due to an imperfect prediction) by controlled smoothing or blurring of the template in the domain where the nonlinear reduction is applied. Among the limitations to this approach, blurring parameters must be chosen experimentally for each case. Since the method is nonlinear, the robustness of the method in preserving signal while reducing noise is not well-understood.

Curvelet-Based Adaptive Matching and Removal of Template Patterns

A recent approach implicitly shapes a template by employing a new data representation called a curvelet representation. This approach first expresses the target and template datasets using a weighted sum of real-valued curvelet functions, which resemble pieces of seismic reflectors. These weights are called curvelet coefficients; such weights are analogous to "Fourier coefficients" that serve as the weights of sinusoids in the representation of signals in the Fourier domain. The implicit adaptation modifies the magnitudes of the template's curvelet coefficients to better match the target's curvelet coefficients. The level of adaptation is controlled by constraining the magnitudes to vary only within a specific range.

A collection of related recent approaches (Hermann and Verschuur, 2004; Yarham et al, 2006; Beyreuther et al, 2005) disclose such a use of real-valued curvelet representations to implicitly adapt a template dataset and subtract it from the target. The adaptation is carried out by "shrinking" (that is, by reducing their magnitudes) the template's curvelet coefficients so that they match the target's curvelet coefficients better. The level of shrinkage is constrained by solely using the magnitudes of the template's curvelet coefficients. The applications addressed in (Hermann and Verschuur, 2004; Yarham et al, 2006; Beyreuther et al, 2005) include dereverberation or multiple noise attenuation, surface wave (ground roll) mitigation, and computation of time-lapse differences.

SUMMARY OF THE INVENTION

In one embodiment, the invention is a method for adapting a template to a target data set so that the template better represents a selected component of the target data set, said method comprising:

(a) transforming the target data using a selected complex-valued, directional, multi-resolution transform ("CDMT") satisfying the Hilbert transform property at least approximately to obtain a set of expansion coefficients that are complex numbers having a magnitude and phase;

(b) selecting an initial template representing a selected component of the target data set and transforming the initial template using said selected CDMT; and (c) adapting the transformed template to the transformed target data by adjusting the template's expansion coefficients within allowed ranges of adjustment so as to better match the expansion coefficients of the target data set, thereby creating an adapted template.

Preferably, the inventive method is computer implemented, and the adapted template is downloaded or saved to computer memory or other storage medium. Typically, but not necessarily, the template will be used to interpret noise in the target data, or to remove noise from the target data. Multiple templates may be adapted simultaneously to better fit the noise.

BRIEF DESCRIPTION OF THE DRAWINGS

The present invention and its advantages will be better understood by referring to the following detailed description and the attached drawings in which:

FIG. 3A illustrates that a sine (upper) and cosine (lower) function are phase-shifted by 90 degrees with respect to each other; FIG. 3B illustrates the cross-sections of two real-valued curvelet elementary functions that comprise the real (upper) and imaginary (lower) parts of a complex curvelet elementary function; the oscillations in these two functions are phase-shifted by 90 degrees with respect to each other;

FIG. 4) illustrates the effect of changing a complex curvelet coefficient's phase on the cross-section of the seismic reflector piece that it represents; as the phase is varied from −90 degrees (bottom) to +90 degrees (top), the location of the peak shifts;

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present inventive method uses complex valued, directional, multiresolution transforms (CDMTs) to adapt a template to a target dataset. CDMTs include the complex wavelet transform, which has been used to perform feature detection, biological image registration, and motion vector estimation. The class of CDMTs useful for the present invention have the property that small shifts in the data manifest themselves as changes in the phase of the coefficients in the data's CDMT representation. The magnitude of the transform coefficients remains almost invariant to the shifts (shift invariance). It is the CDMTs whose elementary functions satisfy the Hilbert transform property possess the shift invariance property. Next, some background information will be given on a recently discovered class of complex valued, directional multiresolution transforms (CDMTs) that are used in the present invention. CDMTs have multiresolution and directional properties for reasons described below. CDMTs are a subset of a larger class of transforms that may be called directional, multiresolution transforms. This larger class also includes real-valued curvelets, which have been used to adapt template datasets for noise attenuation by subsequent subtraction, as discussed previously.

Real-Valued Directional Multiresolution Transforms

Recently developed mathematical tools such as the real oriented dual tree transform (Selesnick et al., (2005)), contourlet/surfacelet transform (Do and Vetterli, 2005; Lu and Do, 2007), and curvelet transform (Candes, Demanet, Donoho, Ying, 2005; US 2007/0038691; Candes and Donoho, 1999) represent a real-valued m-dimensional signal (m>1) using a linear, weighted combination of special real-valued elementary functions.

$$\text{signal}(x_1, x_2, \ldots, x_m) = \sum_i \text{coefficients}_i \times \text{elementary\_functions}_i(x_1, x_2, \ldots, x_m) \quad (1)$$

Figure 1:
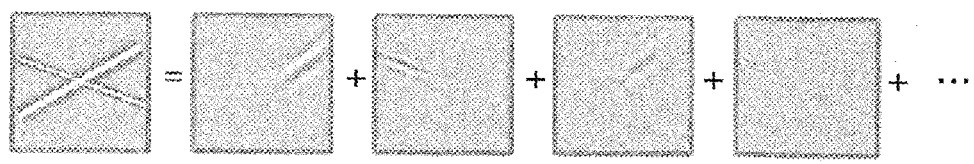
FIG. 1 illustrates a synthetic image, which comprises two intersecting reflectors, and its representation as a sum of weighted curvelet elementary functions; for illustration purposes, only four curvelet elementary functions are displayed.

For example, FIG. 1 illustrates a real-valued synthetic image and its representation as a sum of weighted curvelet elementary functions. The decomposition of a signal in terms of curvelet elementary functions as illustrated by Equation (1) is called the signal's curvelet representation.

Properties of Directional Multiresolution Transform Elementary Functions

Figure 2:
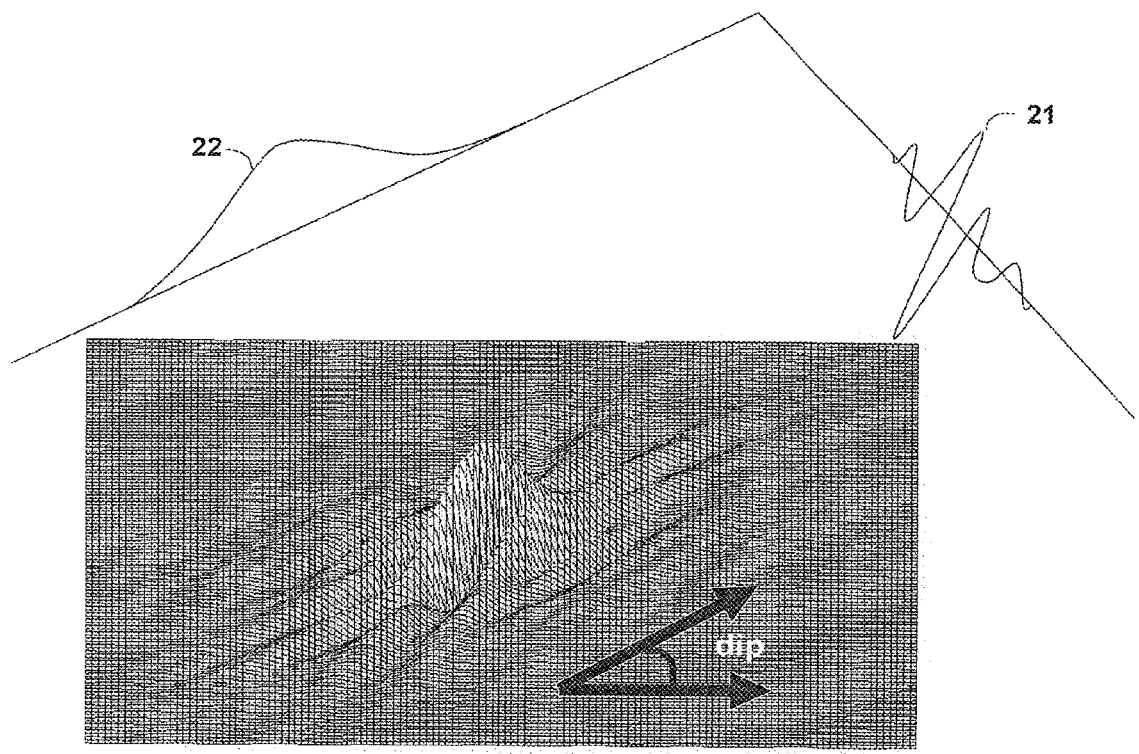
FIG. 2 illustrates the mesh view of a real-valued 2-D curvelet elementary function; each elementary function is anisotropic and is oscillatory along one direction and smoothly varying along the orthogonal direction.

Directional multiresolution transforms provide desirable representations for geophysical data due to multiresolution and directional properties of the elementary functions. As illustrated in FIG. 2, the elementary functions are highly oscillatory in one direction (referred to as the oscillatory direction henceforth), with the function's cross-section in the oscillatory direction resembling a windowed sinusoid 21. Since the oscillations in different elementary functions can occupy different frequency bands (which is a resolution measure), the transform is said to possess multiresolution properties. The transform is said to possess directional properties because the elementary functions are not isotropic. They vary more slowly (i.e., contain lower frequency oscillations) and smoothly in the directions orthogonal to the oscillatory direction; the function's cross section in the orthogonal direction resembles a Gaussian window 22. Each elementary function is spatially localized because its amplitude rapidly decays to zero outside a certain region. The region that essentially localizes an elementary function resembles an oriented needle in two dimensions (2-D) and a disc in three dimensions (3-D). The location, oscillation frequency, and oscillatory direction of each elementary function can be decoded from its index i in Equation (1) or (2) because the functions are ordered.

Complex Valued, Directional, Multiresolution Transforms (CDMTs)

In contrast to Equation (1), a complex valued, directional, multiresolution transform (CDMT) expresses a real-valued m-dimensional signal as a linear, weighted combination of special complex-valued elementary functions.

$$\text{signal}(x_1, \ldots, x_m) = \text{real}\left(\sum_i \text{complex\_coefficients}_i \times \text{complex\_elementary\_fns}_i(x_1, \ldots, x_m)\right) \quad (2)$$

Also, the weights in the linear combination are complex numbers.

It should be noted that any real valued directional, multiresolution representation, such as Equation (1), can be transformed into Equation (2) and vice versa with simple manipulations on the coefficients and the elementary functions. The transformation is based on combining two terms from Equation (1) as follows.

$$a \times \text{elementary\_function}_j + b \times \text{elementary\_function}_k = \quad (3)$$
$$\text{real}((a + jb) \times (\text{elementary\_function}_j - j\text{elementary\_function}_k)) =$$
$$\text{real}((a + jb) \times (\text{complex\_elementary\_function})).$$

In the above equations, j denotes the imaginary unit, and the definition for $$\text{complex\_elementary\_function} = \text{elementary\_function}_j - j\text{elementary\_function}_k. \quad (4)$$

The present invention will be described in terms of the complex representation in Equation (2) solely for the sake of convenience (and superior physical insights). However we emphasize that the use of complex notations is not mandatory because, as illustrated above by Equation (3), a CDMT representation Equation (2) can be equivalently converted to a real valued directional multiresolution transform representation Equation (1) (and vice versa). Hence all operations performed herein on a complex coefficient in Equation (2) can be replicated by using appropriate operations on a pair of real-valued coefficients, which are obtained from an equivalent, real valued directional multiresolution transform representation.

Properties of Desirable CDMTs

The complex valued representation Equation (2) is useful for the present invention only when the complex elementary functions have some special property. The present invention uses CDMTs whose complex elementary functions' real and imaginary parts have the same direction, frequency, and location, but their oscillations are phase-shifted by approximately 90 degrees with respect to each other. This property is henceforth referred to as the Hilbert transform property; see Selesnick et al. ("The Dual-Tree Complex Wavelet Transform," *IEEE Signal Processing Magazine* 22, 123-151 (2005)). See also Chaux et al., "2D Dual-Tree Complex Orthogonal M-Band Wavelet Transform," 2007 *IEEE Intl Conf. on Acoustics, Speech and Signal Processing* (IEEE Cat. No. 07CH37846), pp. III-845-III-848, 2007). Such a phase relationship between a complex curvelet elementary function's real and imaginary parts is similar to the relationship between the real and imaginary parts of a complex sinusoid exp(−jωt), namely sine and cosine functions, sin(ωt) and cos(ωt) (with ω denoting frequency and t denoting a variable such as time), as illustrated in FIG. 3A. The dual tree complex wavelet transform and it variants described from the 2005 Selesnick et al. paper, which collectively will be referred to herein as complex wavelet transform, are well-known examples of CDMTs that satisfy the Hilbert transform property. Other examples of such CDMTs are described below.

CDMTs that satisfy the Hilbert transform property are desirable for the present invention because their representations are approximately shift invariant; that is, the magnitude of the CDMT coefficients remain approximately invariant to small shifts in the data. Such small shifts in the data manifest themselves only as changes in the phase of the data's CDMT coefficients. The effect of the data's shift on the CDMT coefficient's phase can be better understood by using the following complex sinusoid analogy from the 2005 Selesnick et al. paper. Consider a dataset that can be expressed as follows:

$$\text{data}(t) = a\cos(\omega t) + b\sin(\omega t) \quad (5)$$
$$= \text{real}((a + jb) \times (\cos(\omega t) - j\sin(\omega t)))$$
$$= \text{real}((a + jb) \times \exp(-j\omega t))$$

The above expression is a complex-valued representation of the data in terms of a complex sinusoid exp(jωt), with complex valued coefficient (a+jb). If the data shifts in time by Δt, then the representation of the data in terms of the complex sinusoid changes as $$\text{data}(t+\Delta t) = \text{real}((a+jb) \times \exp(-j\omega t) \times \exp(-j\Delta t)). \quad (6)$$

Note that the time shift Δt did not affect the magnitude of the coefficient in the representation, but only affects the phase of the coefficient by a factor linearly proportional to the time shift Δt. For similar reasons, CDMTs satisfying the Hilbert transform property (e.g., dual tree complex wavelet transform) are also (approximately) shift invariant.

Computing CDMT Representations (Equation (2))

A given dataset's CDMT representation is not unique because the number of elementary functions used by all known CDMTs exceeds the number of points in the data. Each of the non-unique CDMT representation differs in the choices of coefficients in Equation (2). The most common CDMT representation is obtained by taking the forward transform of the given dataset. For example, the forward dual tree complex wavelet transform can be implemented using the steps described in the 2005 Selesnick et al. paper. Alternate CDMT representations that employ a sparse set of coefficients in Equation (2) can be obtained by employing minor variations of the iterative method described in (Daubechies et al 2004), as follows:

a. Compute an initial estimate of the coefficients by employing the forward transform.
   b. Process the coefficients by shrinking (see hard thresholding and soft thresholding, for example, in Mallat (*A Wavelet Tour of Signal Processing*, Academic Press, 441-446 (1998)), thereby leaving the large coefficients relatively untouched.
   c. Compute the error between the original signal and the signal represented by the processed coefficients.
   d. Compute the coefficients for the error signal (similar to step (a)).
   e. Add the error signal coefficients to the processed coefficients in step (b) to create an updated set of processed coefficients.
   f. Go to step (b) and iterate.

CDMT representations with a sparse set of coefficients can also be computed by employing iterative techniques such as Matching Pursuit and Orthogonal Matching Pursuit (see J. Tropp and A. C. Gilbert, 2006); Basis pursuit (see Mallat, pg. 409); LASSO (see Tibshirani, "Regression shrinkage and selection via the LASSO," *J. Royal. Statist. Soc B.* 58(1), 267-288 (1996)); LARS (see Efron et al., "Least Angle Regression", *Ann. Statist.* 32(2), 407-499 (2004)); expectation-maximization, Bayesian estimation algorithms, belief propagation or similar techniques referenced in these publications.

CDMTs Preferred for the Present Invention

As stated previously, CDMTs that satisfy the Hilbert transform property at least approximately are preferred for the present invention. For example, the dual tree complex wavelet transform (Selesnick et al., 2005) and all its extensions to higher dimensions satisfy the Hilbert transform property by design. The recently developed complex-valued directional transform recently developed by Nguyen and Oraintara ("A Shift-Invariant Multiscale Multidirection Image Decomposition," IEEE International Conference on Acoustics, Speech, and Signal Processing, 2006 (ICASSP '06), Volume 2, Toulouse, France, May 2006. Download: http://www-ee.uta.edu/msp/pub/01660302.pdf 2006)), which will be referred to herein as complex contourlets, was also designed such that its complex valued elementary functions satisfies the Hilbert transform property, similar to dual tree complex wavelet transform.

Furthermore, the real-valued curvelet transform (Candes, Demanet, Donoho, and Ying (2005); U.S. Patent Application Publication US 2007/0038691; and Candes and Donoho (1999)) representation can be converted to a complex-valued representation that satisfies the Hilbert transform property approximately, as is explained below.

The term curvelet transform as used herein is intended to cover a range of different types of curvelet transforms and techniques for computing them, which are known to persons versed in the field of multi-resolution directional transforms. The conventional real-valued curvelet transform can be implemented by employing a variety of steps (Candes et al. (2005)). Key steps include taking the multidimensional Fourier transform, windowing the Fourier coefficients into annuli (sometimes termed sub-bands or scales) with dyadic widths, further subdividing the annuli into angular wedges, and finally taking inverse Fourier transforms (see Candes et al. (2005) for details).

Currently available implementations for curvelets, for example the commercial software product Curvelab (*Curvelab Software Package (in Matlab and C++)*, Download: www.curvelet.org, (2005)), make fixed choices for the windows, the dyadic widths of the annuli, and number of wedges based on theoretical considerations. A person skilled in the area of multiresolution directional transforms would recognize that a curvelet-like multiresolution directional transformation can also be implemented by varying the windows employed (e.g., use Hamming windows instead of Meyer windows), the annuli widths (e.g., not necessarily dyadic), and the number of wedges (Candes et al. (2005)). For example, related transforms such as contourlets in 2-D (Do and Vetterli (2005)) choose the windows, annuli, and wedges differently from the curvelet transform (Curvelab (2005)).

Further, current implementations such as the Curvelab software product employ the multidimensional uniformly sampled Fourier transform to compute the forward curvelet transform. Instead, the non-uniformly sampled Fourier transform can instead be employed to compute the forward curvelet transform as disclosed by Hennenfent and Herrmann (2006).

A person skilled in the area of multiresolution directional transforms will recognize that curvelet-like multiresolution directional transformations may be implemented via equivalent computational operations in the data domain. For example, related transforms such as contourlets (Do and Vetterli (2005)) can be implemented by performing computations in the data domain.

It is well known that the dual-tree complex wavelet transform and its extensions (Selesnick et al. (2005)) and the complex contourlet transform (including extensions to higher dimensions) satisfy the Hilbert transform property. In addition, the real-valued curvelet transform (Candes et al. (2005); U.S. Patent Application 2007/0038691; and Candes and Donoho (1999)) representation can be converted into a complex valued transform (Equation (2)) that satisfies the Hilbert transform property approximately. The set of real-valued curvelet transform elementary functions is such that each elementary function in the set is complemented by another elementary function in the set with the same direction, frequency, and location, but with oscillations phase-shifted by approximately 90 degrees. The complex valued transform obtained by combining such complementary real-valued curvelet elementary functions as in Equation (3) and (4) to form a complex curvelet transform representation satisfies the Hilbert transform property approximately. For example, the curvelet transform implementation of the Curvelab software product provides an option to compute such a complex valued curvelet representation for a given dataset. FIG. 3B illustrates the cross sections of the real and imaginary curvelet elementary functions that comprise a complex curvelet elementary function, and illustrates the (approximate) 90 degree phase shift relationship between them.

The present invention combines the properties of CDMT representations of geophysical datasets with insights about the phase and amplitude of a CDMT coefficient. CDMTs such as the complex wavelet transform, complex contourlet transform, and complex curvelet transform comprise elementary functions each of which resembles a piece of a seismic reflector (for example, see FIG. 1). Consequently, the CDMT representation of a geophysical dataset (Equation (2)) can be interpreted as a decomposition in terms of small reflector pieces, with each piece having a different frequency, location, and direction.

It was further recognized that changing the amplitude and phase of a CDMT coefficient is equivalent to modifying the amplitudes and shifting the locations of the seismic reflector represented by its corresponding CDMT elementary function. Changing the phase of CDMT coefficients is equivalent to shifting the locations of the seismic reflectors represented by the corresponding elementary function in a special way, namely along the oscillatory direction of the elementary function. This phenomenon can be understood by invoking the complex sinusoid analogy that was introduced above. Consider the representation in Equation (5). Multiplying the coefficient (a+jb) of the complex sinusoid with a phase-modifying term $\exp(-j\epsilon)$ yields $$\text{real}((a+jb) \times \exp(-j\epsilon) \times \exp(-j\omega t)) = \quad (6)$$
$$\text{real}((a+jb) \times \exp(-j\omega(t+\frac{\epsilon}{\omega}))) = \text{data}(t+\frac{\epsilon}{\omega}).$$

From Equation (6), it is clear that the phase modifying term has the effect of shifting the dataset in time by $\epsilon/\omega$. Similar to the complex sinusoid, if the phase of the CDMT coefficients in Equation (2) is modified by $\epsilon$ (this is achieved by multiplying the coefficient by $\exp(-j\epsilon)$), then the seismic reflector represented by the corresponding elementary function shifts approximately in a linear fashion along the oscillatory direction of the elementary function by $\epsilon/\omega$, where $\omega$ is the average frequency of the CDMT elementary function's oscillations.

For example, FIG. 4 illustrates the effect of changing the phase of a complex curvelet coefficient. The curves in the drawing illustrate the effect of varying the phase of a complex curvelet coefficient on cross-sections of a seismic reflector represented by the corresponding complex curvelet elementary function. As the phase of the complex curvelet coefficient is varied from −90 degrees (bottom curve) to +90 degrees (top curve), the seismic reflector shifts along the oscillatory direction as indicated by the non-vertical dashed line 41.

The aforementioned insights underpin the present invention of a method that can perform adaptation on a reflector-by-reflector basis with physically meaningful constraints.

Figure 5:
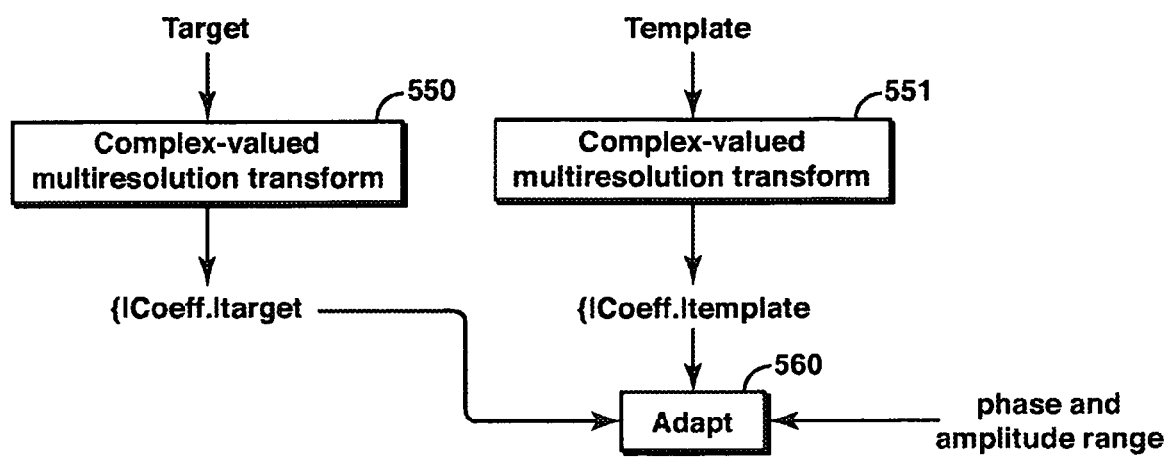
FIG. 5 is a schematic flow chart of basic steps in one embodiment of the present invention.

FIG. 5 is a flow chart showing basic steps in one embodiment of the present inventive method. At step 550, the target dataset is represented in a CDMT representation with chosen parameters, i.e. with parameters specifying which CDMT is bring employed. (The target dataset means the dataset from which noise removal is desired.) At step 551, the same is done for the predicted template, i.e. the initial estimate of what part of the target dataset is noise. These steps returns sets of CDMT coefficients denoted by $\{|\text{Coeff.}|_{target}\exp(j\theta_{target})\}$ and $\{|\text{Coeff.}|_{template}\exp(j\theta_{template})\}$, one for the target and the other for the template. At step 560, the template is adapted by varying the phase and magnitude of the template's CDMT coefficients within allowed ranges so that the adapted coefficients best match the target dataset's coefficients. The range within which the phase of a template's coefficient is allowed to change in turn determines the range within which the seismic reflector represented by the corresponding coefficient's elementary function can shift. Similarly, the range within which the magnitude of a template's coefficient is allowed to change determines the range within which the amplitude of the seismic reflector represented by the corresponding coefficient's elementary function can vary.

The result is that the level of adaptation allowed for each reflector piece of the template can be precisely controlled by using both phase and magnitude constraints on the template's CDMT coefficients. For example, in the noise attenuation applications described above, adaptation by the present inventive method can balance the unavoidable tradeoff between noise subtraction and signal preservation better than all previous techniques.

The published methods described in the Background section as addressing similar technical problems can thus be seen to be significantly different from the present invention. Some are adaptive subtraction techniques but do not use CDMTs to perform the adaptation. Hence they do not enjoy the unique advantages pointed out above. Other published adaptive subtraction techniques shrink the magnitudes of the real-valued curvelet coefficients, with the level of adaptation controlled by choosing the level of shrinkage. The efficacy of currently known curvelet-based methods is limited because constraints that are solely based on the magnitudes of the curvelet coefficients (e.g., shrinking them) do not provide adequate control on the adaptation. For example, in the noise attenuation application discussed above, such an adaptation is insufficient to satisfactorily balance the unavoidable tradeoff between noise subtraction and signal preservation. In contrast, the present inventive method performs adaptation in a very different manner, namely by modifying the phase and magnitude of the template's CDMT coefficients in a controlled fashion. Another difference is that the level of adaptation in the present invention is controlled by placing constraints on both the phase and magnitude of the CDMT coefficients of the template. These differences are believed to confer advantages as explained above.

Michael Jervis discloses using the complex wavelet transform with a wavelet domain hidden Markov Model and applying that to the problem of noise reduction on post-stack seismic data volumes. ("Edge Preserving Filtering on 3-D Seismic Data Using Complex Wavelet Transforms," *SEG/New Orleans* 2006 *Annual Mtg.* pp. 2872-2876.) Jervis modifies noisy wavelet coefficients using thresholding or shrinkage. He does not disclose using a transformed template, and he modifies only the coefficients' magnitudes, independent of their phases.

Patent Application Publication WO 2006/064239 A1 discloses a method of identifying features within a dataset by using a complex-valued multiresolution transform. This work applies a complex-valued multiresolution transform to a target dataset and a candidate dataset, and then uses the phase differences between coefficients of the two datasets to generate a quantitative measure of match. This measure is subsequently used to accept or reject a hypothesis that the target is present. A complex valued multiresolution transform (like a complex wavelet transform) is used to measure the similarity between a template and target image using the phases of the complex coefficients. The technical problem addressed is different, only the phases are used, and there is no suggestion about how the approach to quantify similarity could be extended to develop a constructive method to adapt a template image to better match the target.

In their 1998 article, Magarey and Kingsbury disclose a method to use the complex wavelet transform to compare two consecutive images from a video sequence and estimate the spatial shift (i.e., motion) of each region from one image to the next. The amount and direction of the spatial shift is determined by taking the complex wavelet transform of the two images and comparing the phases of the complex wavelet coefficients' phases. The 1998 Magarey and Kingsbury paper teaches how to estimate the spatial shifts (i.e., motion) between two images by using the phase of the complex coefficients. Again, the disclosed method does not address the present technical problem, and moreover cannot be easily extended to solve the present problem because the process of adaptation involves additional factors such as amplitude mismatches in addition to spatial shifts.

In their 2004 article, Woodward et al. disclose a method to use the complex wavelet transform (Selesnick et al. (2005)) to align biological images, by spatially shifting and warping one template image to another target image. The complex wavelet transform is used because the shifts in the data are captured by changes in the phase of the coefficients in the complex wavelet representation. The phases of the target's and template's complex wavelet coefficients are compared to determine the amount of spatial-domain shifts between the two images. The determined shifts are then used to spatially warp the pixels of template image so that the objects in the template are better aligned with the corresponding'objects in the target image. This alignment process may be considered to be a form of adaptation. The 2004 Woodward et al. paper addresses the problem of aligning biological images by first estimating the spatial shift and then performing a spatial warping to correct for the spatial shifts. The approach taken is to improve the match between the template image and target image by operating on the pixels of template image (i.e., spatial domain warping). In contrast, the present invention performs adaptation by modifying the CDMT coefficients of the template so that adaptation can be performed on a reflector-by-reflector basis. Further, the Woodward et al. paper does not explicitly address the important issue of controlling the level of adaptation. The present inventive method can control the level of adaptation for each reflector by placing constraints on the phase and magnitude of the template's CDMT coefficients during the adaptation. Such a reflector-by-reflector control is particularly important in geophysical applications.

Next, the present invention will be discussed in more detail and alternative embodiments will be disclosed.

The template adaptation step (560 in FIG. 5) may be performed as follows. As illustrated in FIG. 5, steps 550 and 560 return CDMT coefficients $\{|Coeff.|_{target}\exp(j\theta_{target})\}$ and $\{|Coeff.|_{template}\exp(j\theta_{template})\}$ for the target and template respectively. A preferred way to adapt the template to the target is to adapt each coefficient of the template to the corresponding CDMT coefficient of the target.

Let $a_k+j b_k$ and $c_k+j d_k$ denote the k-th CDMT coefficient of the template and target respectively. A preferred option is to modify the magnitude and phase of the template CDMT coefficient $a_k+j b_k$ by multiplication with $\lambda \exp(j\epsilon)$, where the magnitude factor $\lambda$ and the phase $\epsilon$ must belong to a constrained range. The desired X, and C are picked from the prescribed range such that the distance between the adapted template coefficient and the target coefficient is minimized. Formally this can be stated as the following optimization problem: Choose $\lambda$ and $\epsilon$ from a predetermined range of parameters such that they minimize the magnitude of the difference $$|(\lambda\exp(-j\epsilon)\times(a_k+j b_k))-(c_k+j d_k)| \quad (7)$$

The expression in Equation 7 provides a quantitative measure for how well the adapted template coefficient matches the target coefficient. Let $\lambda^\#$ and $\epsilon^\#$ denote the magnitude and phase value that minimize the expression in Equation 7 and also belong to the predetermined range of parameters. Then the adapted template coefficient is given by $\lambda^\# \exp(-j\epsilon^\#)\times(a_k+j b_k)$.

The optimal magnitude and phase, $\lambda^\#$ and $\epsilon^\#$, that jointly minimize Equation 7 can be determined in a sequential fashion without resorting to iteration as follows.

1. Choose $\epsilon^\#$ from the predetermined phase range such that it minimizes $|(\exp(-j\epsilon)\times(a_k+j b_k))-(c_k+j d_k)|$.
2. Choose $\lambda^\#$ from the predetermined magnitude range such that it minimizes $|(\lambda\exp(-j\epsilon^\#)\times(a_k+j b_k))-(c_k+j d_k)|$.

Those skilled in the art will recognize that both steps listed above can be solved easily without resorting to any iterative methods.

In practice, different constraints can be imposed on the predetermined phase and magnitude ranges. One preferred, physically meaningful constraint is to limit the number of pixels by which any seismic reflector is allowed to move during the adaptation. Such a constraint is equivalent to choosing the maximum permissible phase change $\epsilon_{max}$ for each CDMT coefficient such that the term $$\frac{\varepsilon_{max}}{\omega}$$

is a constant, where $\omega$ is the average frequency of the CDMT elementary function's oscillations. For the CDMT representation implemented using the Curvelab software product, to limit the maximum shift of a seismic reflector, the maximum permissible phase change $\epsilon_{max}$ must be reduced by a factor of two with each decreasing frequency band.

In some cases, it may be desirable to constrain the phase and amplitudes range for a given coefficient based on the values that the neighboring coefficients assume after adaptation. Such interdependent constraints on the phase and amplitudes can be imposed adopting the following iterative strategy.

1. Choose an initial set of phase and amplitude range constraints.
2. Represent the target dataset and predicted template, respectively, in terms of a CDMT representation with chosen parameters
3. Adapt the template by varying the phase and magnitude of each CDMT coefficient of the template within the range chosen during the current iteration.
4. Update the phase and amplitude range constraints for all the coefficients by using the actual phase and amplitude values chosen during the current iteration in step 3.
5. Repeat steps 3-4 until convergence.

Figure 6:
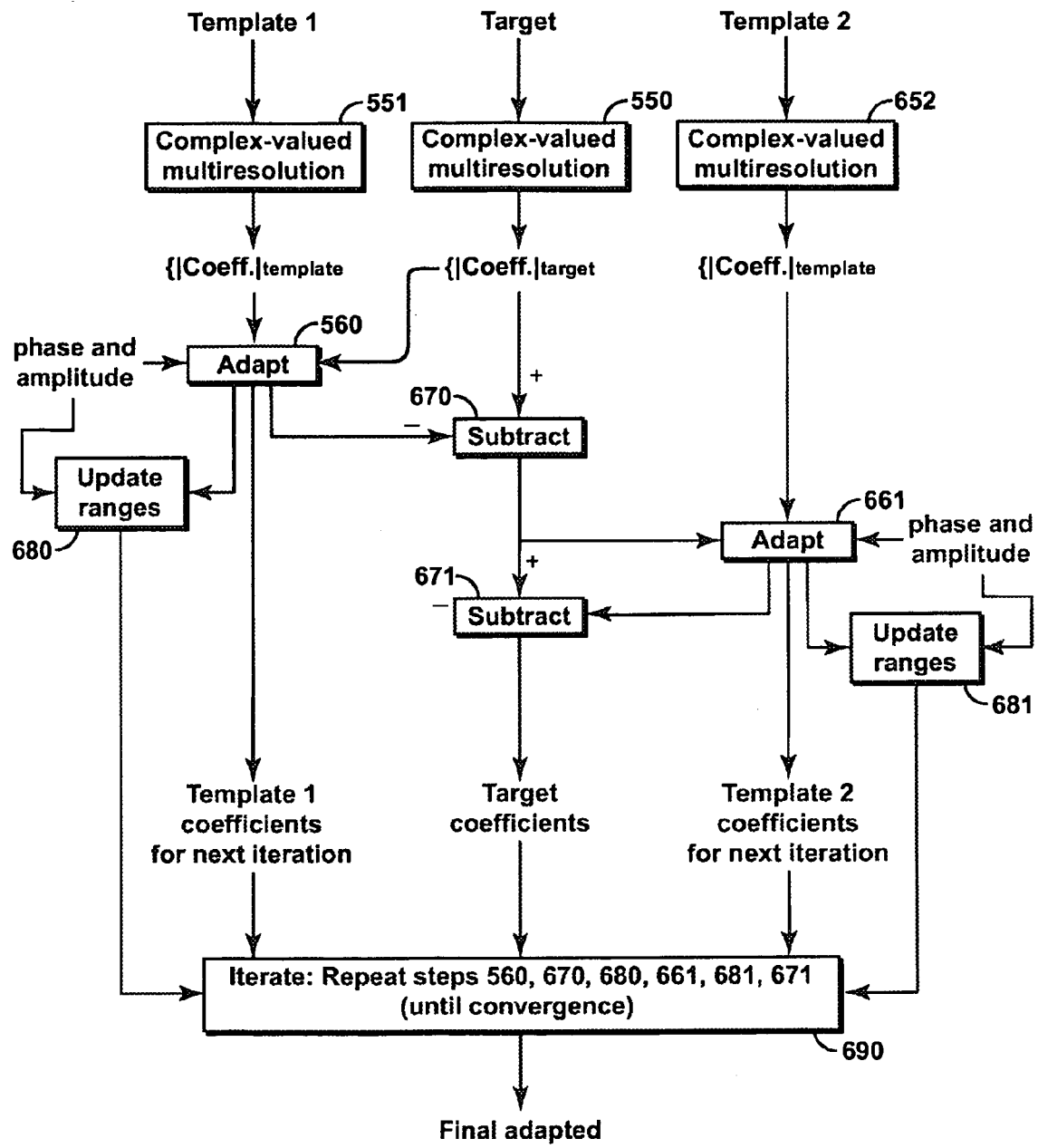
FIG. 6 is a schematic flow chart of basic steps in another embodiment of the present invention in which multiple noise templates (two in this case) are simultaneously adapted to the target dataset in an iterative fashion.

In some cases the target dataset could contain several types of noise patterns. The template for each noise type could be constructed using a different method. In such a case, it is desirable to simultaneously adapt all the noise templates, so that they collectively match the noise features in the target dataset. The following embodiment of the invention describes how two or more template datasets are simultaneously adapted so that they cumulatively match the target dataset better. For example, basic steps in an example embodiment for adapting two template datasets are illustrated in FIG. 6 and further described next.

1. At step 550, the target dataset is represented in terms of CDMT representations with chosen parameters. At steps 551 and 652, the same is done for a first template and a second template, selected as initial predictions of two different types of noise that exist in the dataset.

2. At step 560, the first template is adapted by varying the phase and magnitude of the template's CDMT coefficients within a selected allowed range so that the adapted coefficients best match the target dataset's coefficients. At step 680, the phase and amplitude ranges for the first template are updated using the actual phase and amplitude values chosen during the adaptation, so that any value chosen from the updated range still conforms to the selected allowed range.

3. At step 670, the adapted coefficients of the first template are subtracted from the target dataset's coefficients. This serves as the target for adapting the second template.

4. At step 661, the second template is adapted by varying the phase and magnitude of template's CDMT coefficients within a selected allowed range so that the adapted coefficients best match the updated target coefficients obtained in step 670. At step 681, the phase and amplitude ranges for the second template are updated using the actual phase and amplitude values chosen during the adaptation.

5. At step 671, the adapted coefficients of the second template are subtracted from coefficients used to adapt the second template (result after step 670). This serves as the target for further adapting the two adapted templates during subsequent iterations.

6. At step 690, previous steps beginning with 560 may be sequentially repeated, using the adjusted target dataset and adapted templates from the first iteration. Thus in step 690, the adapted coefficients from the previous iteration along with the updated phase and magnitude ranges are further adapted to improve their match to the target dataset. The iterations are stopped after some predetermined number of iterations are complete, or when the changes introduced by step 690 on the adapted template coefficients are within some pre-selected tolerance. The final, adapted coefficients are obtained after the iterations terminate.

This method described above for adapting two template datasets can be easily modified to accommodate additional template datasets (three or more templates) in a straightforward way. The modifications comprise representing the additional datasets in terms of a chosen CDMT representation, and sequentially introducing steps similar to those for the second template (steps 661, 671, and 681) for each of the additional template datasets. The simultaneously adapted templates obtained using the method described above can subsequently used for a variety of purposes. If they are to be used for noise suppression, all of the simultaneously adapted templates are subtracted from the data.

An important application of the adapted template is to subtract noise patterns contained in the single template dataset from the target dataset. The flexibility to impose constraints on both the phase and magnitude variation of the CDMT coefficients allows the present inventive method to impose more precise and physically meaningful control over the level of adaptation allowed during the subtraction. Consequently, the present inventive method manages to balance the unavoidable tradeoff between noise subtraction and signal preservation better than known techniques. Thus, referring to the flow chart of FIG. 5, the adapted template from step 560 is subtracted from the transform-domain target data set 550 and the result is inverse transformed to yield a noise-attenuated data set. In more detail, the adapted coefficients of the template are subtracted from the target dataset's coefficients. Then the processed target dataset coefficients are retransformed back to the data domain to obtain the noise attenuated data.

The permissible range of variation for the phase and magnitude of the template's CDMT coefficient determines the level of adaptation that the template is allowed, which in turn, balances the tradeoff between noise subtraction and signal preservation. Allowing the phase and magnitude to vary within a larger range provides better noise subtraction, but also cause more damage to the signal. The extreme case of over fitting the noise would be to provide allowed ranges of adjustment for the template's coefficients that are so large that they allow all coefficients to be made equal to the target dataset's expansion coefficients. To avoid over fitting, the choice for the allowed ranges of adjustments would be typically guided by prior knowledge about the accuracy of the template construction step. (For example, in the 4-D application described below, the corresponding features on the base and monitor survey are misaligned by no more than 2 milliseconds; i.e. the exact value of the timing shift will not be known but the range of possible values may be known. Such misalignment information can be used to determine a physically meaningful allowed range of adjustment for the phase during the adaptation step.)

In a variation of this noise attenuation method, instead of performing the template subtraction in the transform domain, the adapted template coefficients can first be retransformed back to the data domain, and then subtracted directly from the target dataset in the data domain. Adaptive template subtraction can be employed to attenuate all types of noises for which a template can be constructed.

One type of noise for which a template can be constructed results from multiple reflections in seismic data. Multiples or reverberations are a particularly problematic type of noise in seismic data. They are created when seismic energy reflects not simply upward from subsurface strata (these upward-only reflections are called "primaries") but upward and downward repeatedly between these strata. Consequently, the recorded data at the seismic sensors contains not only the desired primary seismic energy but also undesirable multiple reflections. Another particularly troublesome noise, both in land data and in shallow marine seismic data, is surface-wave noise or ground roll. This is a type of wave that travels along the surface of the earth and does not sample subsurface horizons of interest at depth. The energy of this wave may be many orders of magnitude larger at the seismic sensors than subsurface reflections of interest. Prediction and removal of this type of noise is often performed by multi-channel filtering and/or by polarization filtering, each of which uses the differences in physical mechanisms of these noises and signals of interest to create a prediction or template of the noise. However, this type of noise is also well suited to attenuation by subtraction of a template adapted by the present inventive method.

The present inventive method can also be used to analyze and exploit 4-D (time-lapse) differences between a base and monitor seismic survey. A base survey is an initial seismic survey collected to establish the state of a reservoir at an initial point in time. A monitor survey is a survey collected at a later point in time—from months to years later—to observe the state of a reservoir after production of hydrocarbons, fracturing, steaming or the application of other processes that it is desirable to monitor. A standard method of comparing a base and monitor survey is to adapt the base survey to appear like the monitor survey. (In this case, the base survey is considered the template for something sought to be removed from the monitor survey.) Then the adapted base survey is subtracted from the monitor survey data to highlight the (usually subtle) differences between them. It is clear that the improvement in adaptation of the present invention suggested by FIG. 4 applies to 4-D analysis as well, even though 4-D analysis does not involve removing noise from either dataset. The present invention can perform superior adaptation and hence produce geologically meaningful time-lapse differences.

Subtracting noise patterns contained across two or more template datasets adapted as in FIG. 6, may be done as follows. After following the steps outlined in FIG. 6 to simultaneously adapt all the template datasets to the target dataset, the adapted coefficients of all the templates are subtracted from the target dataset's coefficients. Then, the processed target dataset coefficients are transformed back to the data domain to obtain the noise attenuated data. Instead of performing the subtraction in the CDMT domain, the adapted template coefficients can alternatively be first retransformed back to the data domain, and then subtracted directly from the target dataset in the data domain.

An example in which multiple templates are advantageous in removing noise from a dataset is the case of internal multiple reflection effects in seismic data. The internal multiples originating from different subsurface layers can be predicted by using an appropriate physics-based method. See, for example, the following references:
1. "Removal of internal multiples," Berkhout and Verschuur, *SEG Expanded Abstracts* 18, 1334 (1999);
2. "Comparing the interface and point scatterer methods for attenuating internal multiples: A study with synthetic data—Part I," Verschuur et al., *SEG Expanded Abstracts* 17, 1519 (1998); and
3. "Surface and internal multiple removal, towards a methodology," Verschuur and Berkhout, *SEG Expanded Abstracts* 15, 1539 (1996).

A general work flow that may be used to apply the present inventive method to the internal multiple problem is as follows:

1. Data interpolation and reconstruction—regularizing the data so that the assumptions made by multiple prediction algorithms are satisfied, specifically so that seismic data traces are located everywhere the multiple prediction algorithms need them to be in order to compute the prediction accurately 2. Identification of key internal multiple generators—since reverberations may occur between potentially any subsurface strata, the application of the prediction algorithms require knowledge of the most important multiple generating strata. This identification usually requires well log data and may be accomplished by comparing a synthetic seismogram constructed with primaries only to a synthetic seismogram constructed with all the internal multiples as well. A preferred method of accomplishing the identification is to model a vertical seismic profile and process it via very careful separation of up- and downgoing waves, followed by deconvolution of up—by downgoing waves as described in "Vertical seismic profile reflectivity: Ups over downs," Ross and Shah, *Geophysics* 52, 1149 to (1987).

3. Multiple prediction—using the algorithms for prediction described in the above references and others similar to them. Since there are almost always more than one pair of important internal multiple generating horizons in the data, there will almost always be more than one predicted multiple template.

4. Adaptation of all of the predicted multiples to the data simultaneously. The need for adapting them simultaneously is to ensure that overlap and crosstalk between the several templates are appropriately controlled. The adaptation is followed by subtraction of the simultaneously adapted predictions from the data. Such an adaptation can be performed by employing the steps illustrated in FIG. 6. Each initial guess or starting prediction 551, 652, etc. for the various templates would correspond to a different one of the reflecting horizons identified in step 2 above, with the corresponding prediction generated as described in step 3.

As is obvious from this work flow, for the internal multiples problem, the strategy of shaping all the templates to the target (data) simultaneously, and then subtracting the shaped templates from the target dataset, is very natural because of the several multiple predictions that of necessity result from the prediction step.

Using the present inventive method to adapt several templates from a target and then subtracting them from the target can also be used for other types of seismic noise (surface-related multiple elimination, ground roll, etc.) besides the internal multiple elimination problem just described in detail. All that is required is that several partial predictions of the noise are available. For example, in the ground roll problem, a prediction algorithm might predict only one ground roll mode at a time, or per iteration. These several predictions can all be collected, simultaneously adapted, and finally subtracted from the target dataset. Furthermore, the adaptation and subtraction of several templates applies as well to the time-lapse difference problem when there are several monitor surveys acquired after the base survey.

Seismic data can be decomposed into a variety of smaller datasets, where all the traces in each smaller dataset, called common offset dataset, have the same spacing (that is, offset) between the seismic source and receiver. The process of determining the acoustic wave velocity in the subsurface involves manipulating the common offset datasets so that the seismic response from the same subsurface reflector is aligned across the offset datasets. This process is called moveout correction. Typically conventional velocity determination schemes fail to perfectly align the offset datasets. The present inventive method can also be used to perform residual moveout correction after the offset volumes are approximately aligned; that is, our method can correct for the residual errors. Key steps in this approach are as follows.

1. Represent all the offset datasets in terms of a CDMT representation with chosen parameters.

2. Choose a reference dataset as the target and an offset dataset as the template.

3. Adapt the template by varying the phase and magnitude of template's CDMT coefficient within an allowed range (step 560) so that the adapted coefficient best matches the target dataset's coefficients.

Typically, steps 2 and 3 may need to be performed iteratively with different choices for the reference and offset datasets at each iteration.

In some cases, the templates can contain well-understood effects that need to be eliminated before the inventive method is applied. For example, in the multiple attenuation problem, the predicted template for the multiples often have errors such as large timing shifts that are uniform throughout the dataset. Such large-scale, uniform errors are better handled by conventional adaptation methods such as the least squares method. The present inventive method can then be employed to perform the residual adaptation.

In some cases, the target and the templates can contain spurious noise components that need to be attenuated. Recent work (Hennenfent and Herrmann (2006), and Yarham et al. (2006)) have demonstrated that CDMT representations such as curvelet representations are very useful for attenuating noises that corrupt seismic data. The key step in noise removal involves shrinking the small curvelet representation weights in Equation (2) (see hard thresholding and soft thresholding, for example, pgs. 441-446 in Mallat's book). It is easy to incorporate optional noise attenuation steps into the present invention, thereby making our template adaptation robust to noise. In the flow chart of FIG. 5, such steps would occur just after steps 550 and 551.

EXAMPLES

Figure 7A:
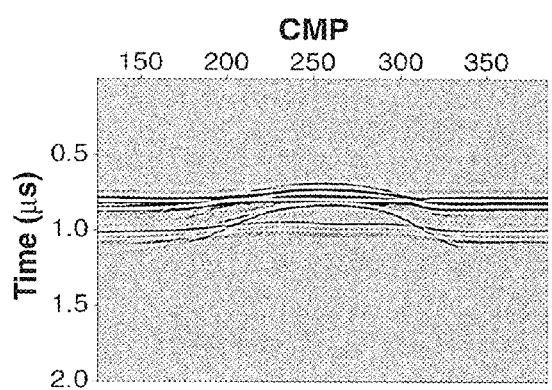
FIG. 7A illustrates a synthetic target dataset.
Figure 7B:
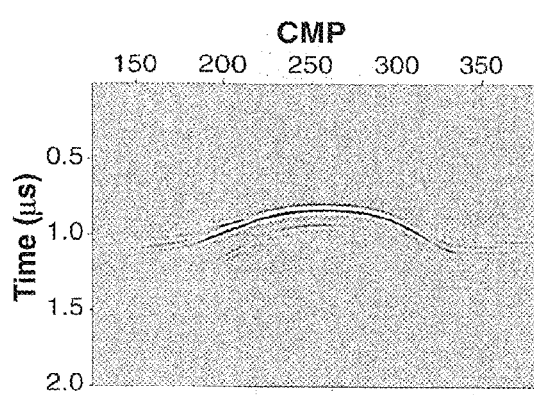
FIGS. 7B and 7C illustrate two template datasets that need to be adaptively subtracted from target dataset illustrated by FIG. 7A
Figure 7C:
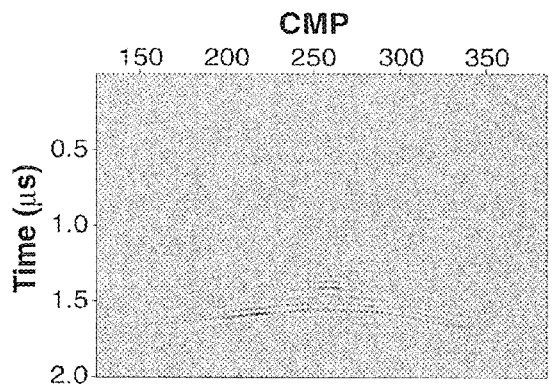
Figure 7D:
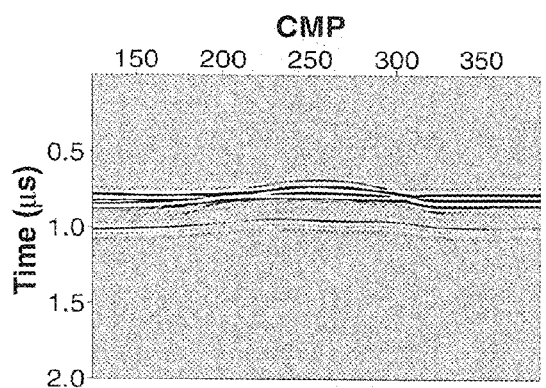
FIG. 7D shows the adaptive subtraction result obtained by using the present inventive method, with complex curvelets as the chosen complex valued transform.

FIGS. 7A-D illustrate the results obtained by using the present inventive method to attenuate the noise patterns in two predicted templates (FIGS. 7B and 7C) from a target dataset (FIG. 7A). The noise in the target cannot be attenuated by straightforward subtraction of the templates because the predicted noise patterns contain spatially and temporally varying errors. FIG. 7D illustrates the result obtained by first adapting the two template datasets to the target dataset (as described in FIG. 6) by using the complex curvelet transform, and then subtracting the adapted templates from the target. As illustrated, the adaptive subtraction removes the template patterns with minimal damage to the underlying signal.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting adapted template(s) or noise-suppressed target dataset may either be downloaded or saved to computer memory.

REFERENCES

Candes, E., Demanet, L., Donoho, D., and Ying, L. *Fast discrete curvelet transforms*. SIAM Multiscale Model. Simul., vol. 5, no. 3, pp. 861-899, 2006 (published online in July 2005); herein sometimes referenced as Candes et al. (2005).

Candes, E., Demanet, L., and Donoho, D. "Methods for performing fast discrete curvelet transforms of data," U.S. Patent Application Publication US 2007/0038691.

*Curvelab Software Package (in Matlab and C++)*, Download: www.curvelet.org, (2005).

E. J. Candès and D. L. Donoho, "Curvelets—A Surprisingly Effective Nonadaptive Representation for Objects with Edges, Curves and Surfaces," L. L. Schumaker et al. (ed's), Vanderbilt University Press, Nashville, Tenn. (1999).

I. Daubechies, M. Defrise, C. Del Mol, "An iterative thresholding algorithm for linear inverse problems with a sparsity constraint," *Communications on pure and applied mathematics* 57, 1413-1457 (2004).

M. N. Do and M. Vetterli, "The contourlet transform: an efficient directional multiresolution image representation," *IEEE Transactions Image on Processing* 14, 2091-2106 (2005).

Yue M. Lu and Minh N. Do, "Multidimensional Directional Filter Banks and Surfacelets," *IEEE Transactions on Image Processing* 16, 918-931 (2007).

I W Selesnick, R G Baraniuk, and N G Kingsbury, "The Dual-Tree Complex Wavelet Transform," *IEEE Signal Processing Magazine* 22, 123-151 (2005).

Felix J. Herrmann and Eric Verschuur, "Curvelet-domain multiple elimination with sparseness constraints," *74th SEG Annual Meeting, Expanded Abstracts* (2004).

C. Yarham, U. Boeniger, F. Herrmann, "Curvelet-based ground roll removal," *76th SEG Annual Meeting, Expanded Abstracts*, SPNA 1.7 (2006).

S. Mallat, A Wavelet Tour of Signal Processing, Academic Press, (1998).

G. Hennenfent and F. J. Herrmann, "Seismic denoising with nonuniformly sampled curvelets," *Computing in Science and Engineering* 8, 16-25 (2006).

A. M. Woodward, J. J. Rowland, and D. B Kell, "Fast automatic registration of images using the phase of a complex wavelet transform: application to proteome gels," *The Analyst* 129, 542-552 (2004); Website: www.rsc.org/analyst.

C. Yarham, U. Boeniger, F. Herrmann, "Curvelet-based ground roll removal," *76th SEG Annual Meeting, Expanded Abstracts*, SPNA 1.7 (2006).

Felix J. Herrmann and Eric Verschuur, "Curvelet-domain multiple elimination with sparseness constraints," *74th SEG Annual Meeting, Expanded Abstracts* (2004).

Moritz Beyreuther, Jamin Cristall, and Felix J. Herrmann, "Computation of time-lapse differences with 3D directional frames," *SEG Expanded Abstracts* 24, 2488 (2005).

T. T. Nguyen and S. Oraintara, "A Shift-Invariant Multiscale-Multidirection Image Decomposition," *IEEE International Conference on Acoustics, Speech, and Signal Processing*, 2006 (ICASSP '06) 2, Toulouse, France (May 2006). Download: http://www-ee.uta.edu/msp/pub/01660302.pdf Lu and Do, "Multidimensional Directional Filter Banks and Surfacelets," *IEEE Transactions on Image Processing* 16, 918-931 (2007).

J F A Magarey and N G Kingsbury, "Motion estimation using a complex-valued wavelet transform", *IEEE Trans. on Signal Processing* 46, 1069-84 (1998).

The invention claimed is:

1. A method for developing at least one template to use to remove noise from or interpret noise in a target data set of geophysical data, wherein the template is adapted to the target dataset, said method comprising:

(a) transforming the target data using a selected complex-valued, directional, multi-resolution transform ("CDMT") satisfying the Hilbert transform property at least approximately to obtain a set of expansion coefficients that are complex numbers having a magnitude and phase;

(b) selecting an initial template representing noise in the target data set and transforming the initial template using said selected CDMT;

(c) adapting the transformed template to the transformed target data by adjusting the template's expansion coefficients within allowed ranges of adjustment so as to better match the expansion coefficients of the target data set, thereby creating an adapted template; and (d) using the adapted template to suppress noise, further process, or interpret the target data set or other geophysical data in order to prospect for or produce hydrocarbons;

wherein at least one of (a)-(c) are performed using a computer.

2. The method of claim 1, further comprising subtracting the adapted template from the target data in the transform domain and inverse transforming back to the data domain, or inverse transforming the adapted template to the data domain and then subtracting it from the target data, thereby creating a noise-suppressed target dataset.

3. The method of claim 2, further comprising using the noise-suppressed target dataset to identify potential commercial hydrocarbon reservoirs.

4. The method of claim 1, wherein the CDMT is a complex wavelet transform, complex contourlet transform, or a complex curvelet transform.

5. The method of claim 1, wherein the complex expansion coefficients for template are provided a range of adjustment for the magnitude of each complex coefficient and a range of adjustment for the phase of each complex coefficient, thereby constraining the adapting of the template, said ranges of adjustment being selected to balance tradeoff between noise subtraction and signal preservation when the adapted template is subtracted from the target dataset.

6. The method of claim 1, wherein each CDMT expansion coefficient of the template is multiplied by $\lambda \exp(j\epsilon)$, where $j=\sqrt{(-1)}$ and $\lambda$ and $\epsilon$ are factors that are solved for by minimizing the magnitude of the difference between corresponding coefficients in the CDMT expansions of the target data and the template.

7. The method of claim 1, further comprising iterating the adapting step, after resetting the adjustment ranges, until convergence within a pre-selected tolerance or other stopping condition is reached.

8. The method of claim 1, further comprising selecting at least one additional initial template and transforming it using said selected CDMT, and simultaneously adapting all templates to the transformed target.

9. The method of claim 8, wherein the target data are seismic data and the noise includes multiple reflection data, and each template is selected to represent, in the CDMT transform domain, a reflector identified as contributing to multiple reflection noise.

10. The method of claim 8, further comprising subtracting the adapted templates from the target data in the transform domain and inverse transforming back to the data domain, or inverse transforming the adapted templates to the data domain and then subtracting them from the target data.

11. The method of claim 1, wherein the selected template is a first template and further comprising:

(d) subtracting the adjusted coefficients of the first template from the target dataset's expansion coefficients;

(e) selecting an initial second template and transforming it using said selected CDMT; and (f) adapting the transformed second template to the transformed target resulting from step (d) by adjusting the expansion coefficients for the template within allowed ranges of adjustment so as to better match the expansion coefficients of the target dataset after the subtraction of step (d), thereby creating an adapted second template.

12. The method of claim 11, further comprising:

(g) subtracting the adjusted coefficients of the second template from the target dataset's expansion coefficients as they result from step (d); and (h) taking the target dataset expansion resulting from step (g) and the two template expansions resulting from steps (c) and (f) as starting quantities for an iterative cycle, and repeating steps (c)-(d) and (f)-(g).

13. The method of claim 12, further comprising repeating step (g) until a predetermined convergence criterion or other stopping point is reached.

14. The method of claim 13, further comprising subtracting both adapted templates resulting after convergence or stopping point from the target data from step (a) in the transform domain and inverse transforming back to the data domain, or inverse transforming the adapted templates to the data domain and then subtracting them from the target data, thereby creating a noise-suppressed target dataset.

15. The method of claim 13, wherein each template adapting is performed within pre-selected adjustment ranges, and the ranges are updated after each iterative cycle.

16. The method of claim 1, wherein adjusting a template expansion coefficient consists of adjusting both the magnitude and the phase of the expansion coefficient.

17. A method for producing hydrocarbons from a subsurface region, comprising:

(a) conducting a seismic survey of the subsurface region;

(b) obtaining survey data with noise removed by steps comprising:

transforming the survey data using a selected complex-valued, directional, multi-resolution transform ("CDMT") satisfying the Hilbert transform property at least approximately to obtain a set of expansion coefficients that are complex numbers having a magnitude and phase;

(ii) selecting an initial template representing noise in the survey data and transforming the initial template using said selected CDMT;

(iii) adapting the transformed template to the transformed survey data by adjusting the template's expansion coefficients within allowed ranges of adjustment so as to better match the expansion coefficients of the survey data, thereby creating an adapted template; and (iv) subtracting the adapted template from the survey data in the transform domain and inverse transforming back to the data domain, or inverse transforming the adapted template to the data domain and then subtracting it from the survey data, thereby creating a noise-suppressed survey dataset;

(c) drilling a well into the subsurface region based at least in part on interpretation of the noise-suppressed survey dataset; and (d) producing hydrocarbons from the well.

18. A computer-implemented method for adapting a template to a target data set of geophysical data so that the template better represents a selected component of the target data set, said method comprising:

(a) transforming the target data using a selected complex-valued, directional, multi-resolution transform ("CDMT") satisfying the Hilbert transform property at least approximately to obtain a set of expansion coefficients that are complex numbers having a magnitude and phase;

(b) selecting an initial template representing a selected component of the target data set and transforming the initial template using said selected CDMT;

(c) adapting the transformed template to the transformed target data by adjusting the template's expansion coefficients within allowed ranges of adjustment so as to better match the expansion coefficients of the target data set, thereby creating an adapted template; and (d) using the adapted template to suppress noise, further process, or interpret the target data set or other geophysical data in order to prospect for or produce hydrocarbons;

wherein at least one of (a)-(c) are performed using a computer.

19. The method of claim 18, wherein the selected component of the target data set is noise in the data set.

20. The method of claim 18, wherein the allowed ranges of adjustment are determined based on considerations of signal preservation and estimated error in construction of the initial template.

21. The method of claim 20, wherein error in construction of the initial template includes at least a time shift, wherein the range of possible time shift values is ascertainable.

22. The method of claim 18, wherein the target data set is acquired from a monitor survey of a subsurface region, and wherein the selected initial template is, or is determined from, an earlier base survey of the subsurface region, and the adapted template is subtracted from the target data set to highlight differences between the base survey and the monitor survey.

* * * * *